US009577743B2

(12) United States Patent
Rhelimi

(10) Patent No.: US 9,577,743 B2
(45) Date of Patent: Feb. 21, 2017

(54) COMMUNICATIONS SYSTEM HAVING A SECURE CREDENTIALS STORAGE DEVICE

(75) Inventor: Alain Rhelimi, Meudon (FR)

(73) Assignee: GEMALTO SA, Meudon (FR)

( * ) Notice: Subject to any disclaimer, the term of this patent is extended or adjusted under 35 U.S.C. 154(b) by 65 days.

(21) Appl. No.: 13/996,405

(22) PCT Filed: Dec. 6, 2011

(86) PCT No.: PCT/EP2011/071926
§ 371 (c)(1),
(2), (4) Date: Jun. 20, 2013

(87) PCT Pub. No.: WO2012/084497
PCT Pub. Date: Jun. 28, 2012

(65) Prior Publication Data
US 2013/0273846 A1 Oct. 17, 2013

(30) Foreign Application Priority Data
Dec. 22, 2010 (EP) .................................... 10306494

(51) Int. Cl.
*H04B 5/00* (2006.01)
*H04B 7/26* (2006.01)
*G07F 7/10* (2006.01)
*H04W 12/06* (2009.01)
*H04W 4/00* (2009.01)
*H04L 29/06* (2006.01)

(52) U.S. Cl.
CPC ............ *H04B 7/2603* (2013.01); *G07F 7/1008* (2013.01); *H04W 4/008* (2013.01); *H04W 12/06* (2013.01); *H04L 63/0492* (2013.01)

(58) Field of Classification Search
CPC ......... G11C 16/04; H04B 7/2603; G06K 7/00; G06K 19/07; G06K 19/077
USPC ..................... 455/41.1, 41.2, 41.3
See application file for complete search history.

(56) References Cited

U.S. PATENT DOCUMENTS

| 8,233,457 B1* | 7/2012 | Chen | G01S 13/878 370/332 |
| 2005/0113025 A1* | 5/2005 | Akamatsu | H04N 1/00278 455/41.3 |
| 2006/0091200 A1* | 5/2006 | Lai | G06K 7/0008 235/380 |

(Continued)

FOREIGN PATENT DOCUMENTS

FR WO 2009083679 * 7/2009
JP 2009044418 A 2/2009

(Continued)

OTHER PUBLICATIONS

PCT/EP2011/071926 International Search Report, Jan. 17, 2012, European Patent Office, P.B. 5818 Patentlaan 2 NL—2280 HV Rijswijk.

*Primary Examiner* — M D Talukder
(74) *Attorney, Agent, or Firm* — The Jansson Firm; Pehr B. Jansson

(57) ABSTRACT

The invention relates to a communication system comprising a terminal (10), a first device (1) adapted to exchange data with said terminal (10), a second device (2) adapted to exchange data with said terminal (10), characterized in that it comprises means for pairing said first (1) and second (2) devices so as said second device (2) exchanges data with said terminal (10) through said first device (1).

16 Claims, 1 Drawing Sheet

(56) References Cited

U.S. PATENT DOCUMENTS

| | | | |
|---|---|---|---|
| 2006/0092953 A1* | 5/2006 | Haverinen | H04L 63/061 370/400 |
| 2007/0242729 A1* | 10/2007 | Quinn | H04L 63/061 375/130 |
| 2007/0253251 A1* | 11/2007 | Mizushima | G06K 19/07 365/185.04 |
| 2009/0275283 A1* | 11/2009 | Zhuyan | A61B 5/0028 455/41.2 |
| 2010/0019033 A1* | 1/2010 | Jolivet | G06K 7/0008 235/380 |
| 2010/0077466 A1* | 3/2010 | Lowe | H04L 63/062 726/6 |
| 2010/0084465 A1* | 4/2010 | Jolivet | G06K 7/0008 235/439 |
| 2010/0133336 A1* | 6/2010 | Bailey | G06Q 20/353 235/380 |
| 2010/0151790 A1* | 6/2010 | Hoeksel | G06K 7/0008 455/41.2 |
| 2010/0214116 A1* | 8/2010 | Huang | G01S 5/14 340/8.1 |
| 2010/0267419 A1 | 10/2010 | Nishizawa et al. | |
| 2011/0171907 A1* | 7/2011 | Jolivet | H04L 63/0492 455/41.1 |
| 2013/0273846 A1* | 10/2013 | Rhelimi | G07F 7/1008 455/41.1 |
| 2015/0126109 A1* | 5/2015 | Keshavdas | H04B 5/0031 455/41.1 |

FOREIGN PATENT DOCUMENTS

| | | |
|---|---|---|
| JP | 2009159564 A | 7/2009 |
| WO | WO2009083679 A2 | 7/2009 |

* cited by examiner

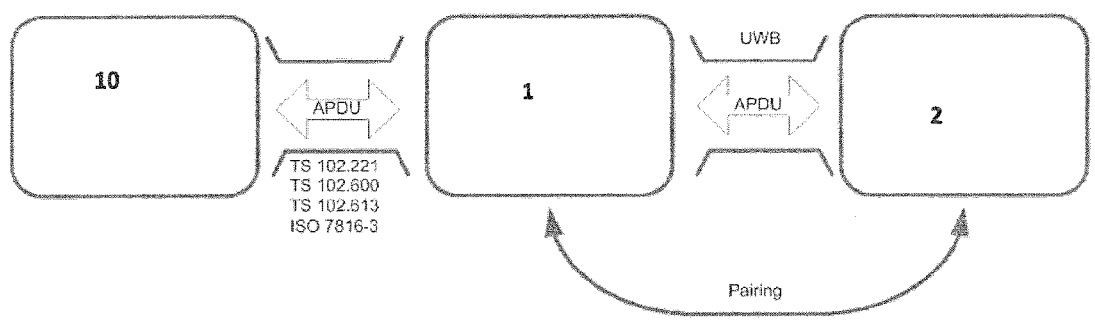

COMMUNICATIONS SYSTEM HAVING A SECURE CREDENTIALS STORAGE DEVICE

FIELD OF THE INVENTION

The present invention relates generally products using secure elements such as smart cards or SD cards, etc. . . . and more specifically to a communication system.

BACKGROUND OF THE INVENTION

It is a good practice to constantly challenge a product or service in terms of costs, functionalities, etc. . . . . According to market constraints and user's requirements, some functionality may be reduced for the benefits of others. Functionality having the last market pressure or hidden from the user may disappear, integrated or limited to essential features.

Another trends highly demonstrated during the past years push the industry to offer more and more user friendly devices exposing intuitive usage. Some devices tend to concentrate more and more vector of services (telecommunication, payment, access control, . . . ) in a single device.

Any products having a one secure device as a smart card to one device's reader connection may at long term merge into a single element. There is then a need for keeping the essential credentials in a secure portable device such as a smart cart, and federate multiple secure elements in a device without physical constraints related to the legacy device accepting standard smart cards.

It is then an object of the invention to provide a communication system and a method in which a secure element such as a UICC is located outside the terminal as a secure physical component on which credentials may be managed.

SUMMARY

Thereto, the present invention provides a communication system comprising a terminal, a first device adapted to exchange data with said terminal, a second device adapted to exchange data with said terminal, characterized in that it comprises means for pairing said first and second devices so as said second device exchanges data with said terminal through said first device.

According to another aspect of the invention, the first device may be adapted to be located in said terminal.

According to other aspects of the invention, the second device may be a remote device.

According to another aspect of the invention, the second device may be adapted to embed a secure element.

According to another aspect of the invention, the means for pairing said first device and second device may be near field communication (NFC) based technology.

According to another aspect of the invention, the means for pairing said first device and second device may be intra body communication (IBC) based technology.

According to another aspect of the invention, the means for pairing said first device and second device may be near field communication (NFC) based technology and intra body communication (IBC) based technology.

According to another aspect of the invention, the first device may comprise a secure element adapted to authenticate said first device as a honest point of communication.

The invention also provides a method for exchanging data between a terminal, a first device, a second device, said terminal comprising said first device, said second device being a remote device characterized in that it comprises establishing a communication tunnel by pairing between said first device and a second device, exchanging data between the second device and the terminal through said first device.

According to another aspect of the invention, the method may comprise using UWB as wireless communication channel for exchanging application data after the pairing of said devices.

According to another aspect of the invention, the pairing between the first device and the second device may be released when a distance between the terminal and the remote second device is greater than a predetermined distance, said distance between the terminal and the remote second device being measured with Real Time Location Service technology.

According to another aspect of the invention, the method may comprise a mutual authentication step between said first device and said second device.

According to another aspect of the invention, the method may comprise receiving APDU commands from the remote second device, sending said APDU commands to the terminal and vice versa.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawing described below:

FIG. 1 schematically shows a communication system according to an embodiment of the invention

DETAILED DESCRIPTION

The present invention may be understood according to the detailed description provided herein.

Shown in FIG. 1 is a communication system comprising a terminal 10, a first device 1, and a second device 2.

The terminal 1 adapted to receive the first device 1, such as a proxy card 1.

The first device 1 is adapted to exchange data with the terminal 10 and is a local device such as a smart card irrespective of the form factor, i.e. ID1, 2FF, 3FF, SD card, etc. . . . . The first device 1 is for example integrated in the terminal 10, such as a mobile phone.

It will be understood that the mobile phone is not a limited example and that any device adapted for receiving such first device 1 may be used, such as a digital camera or an electronic funds transfer terminal or a portable computer, etc. . . . .

The second device 2 is adapted to exchange data with the terminal 10. The second device 2 is a remote device and may have any suitable form factor. The remote second device 2 embeds at least a secure element (not represented) performing secure operations as the legacy smart cards in the terminal 10. The secure element, such as a UICC is then remote but appears as local for the terminal 10 via the proxy card 1.

It will be understood that this secure element may be removable or integrated in the remote second device 2.

It will be also understood that the remote UICC is not a limited example, and that any suitable secure element may be used, such as for example a SD card, etc. . . . .

The proxy card 1 has the legacy form factor and acts as a proxy to the remote device 2.

The communication system comprises means for pairing the first device 1 and the second device 2 so as the second device 2 is able to exchange data with the terminal 10 through the first device 1. A fast wireless tunnel is established by pairing between the first device 1, which acts as a proxy smart card 1, and the remote device 2. For pairing these devices, a first means of communication for short range operations (few centimeters) is able to select the device to pair. This first means of communication also called hereinafter means of vicinity communication, allows exchanging essential data for bootstrapping a second means of communication exposing high performances (larger range and higher speed) as the UWB (IEEE802.15.4a), Bluetooth, Zigbee, Wifi. Optionally, in order to avoid security attacks as the Man-In-The-Middle attacks, the proxy card 1 comprises a secure element (not represented) to authenticate the proxy card 1 as an honest point of communication.

The pairing is released after each power cycle of the terminal 10 or the remote second device 2 or after an explicit action of the user on terminal 10 or the remote second device 2 or if an application distance between the terminal 10 and the remote second device 2 is greater than a defined limit. The RTLS technology (Real Time Location Service) may be applied to measure the said application distance.

In an embodiment, the means for pairing said first device 1 and second device 2 are near field communication (NFC). By approaching the NFC antenna of the proxy card 1 and the remote second device 2, a channel of communication is established for exchanging essential data for the pairing.

According to the invention, a method for exchanging data between the terminal 10 and the remote device 2 comprising a secure element such as a UICC, comprises a step of mutual authentication between the remote UICC and the proxy card 1 in order to authorize communication between the handset and the remote UICC. Once the authentication is done, data are exchanged between the terminal 10 and the remote UICC through the proxy card 1. For doing so, the proxy card 1 comprises means for receiving data such as APDU commands and means for transmitting such data from the remote UICC to the terminal 10 and vice versa. There is either no need for the user to search for the element to pair or to enter any password as it is usual for the Bluetooth pairing.

According to another embodiment, the means for pairing said first device 1 and the second devices 2 are intra body communication (IBC) based technology. By touching the terminal 10, the user establishes a channel of communication via the proxy card 1 embedding the IBC technology and the remote second device 2 close to the user's body. This channel of communication allows exchanging essential data for the pairing.

According to another embodiment the means for pairing said first device 1 and second device 2 are near field communication (NFC) based technology and intra body communication (IBC) based technology.

Thanks to the invention, the remote secure element of the second device 2 is physically independent of the terminal 10. The proxy smart card 1 for example makes a wireless data tunnel to a smart card holder such as a Smart badge holder hosting the removable secure element or embedding such secure element. The remote device 2 which hosts the secure element may provide new capability as the NFC or IBC technology and offers to upgrade legacy mobile terminals.

Thanks to this communication system, there is no more UICC in the terminal. The portability from a user to another user is maximal, easiest and fastest. It is then easy to change a terminal into another. The user may have many handsets in having a single remote UICC.

The proxy card offers a migration path for the terminal maker exposing a minimal impact of the UICC on its design. There is no need for the terminal to embed any secure element.

The invention claimed is:

1. A communication system comprising:
a mobile terminal,
a first device of smart card type adapted to exchange data with said mobile terminal, and adapted to act as a proxy for a second device, which is also adapted to exchange data with said mobile terminal, said first device is located in said mobile terminal, said second device is a remote device located outside the mobile terminal, wherein said second device is a secure device comprising a Universal Integrated Circuit Card (UICC) in which credentials are stored, said first and second devices being adapted to establish a wireless communication tunnel by pairing said first and second devices for the second device to exchange data with said mobile terminal through said first device so that the secure device appears local for the mobile terminal, the pairing being released after each power cycle of the mobile terminal.

2. The communication system according to claim 1, wherein said second device is adapted to embed a secure element.

3. The communication system according to claim 1, wherein the pairing of said first device and second device is based on near field communication (NFC) technology.

4. The communication system according to claim 1, wherein the pairing of said first device and second device is based on intra body communication (IBC) technology.

5. The communication system according to claim 1, wherein the pairing of said first device and second device is based on near field communication (NFC) and intra body communication (IBC) technologies.

6. The communication system according to claim 1, wherein the first device comprises a secure element adapted to authenticate said smart card as a honest point of communication.

7. A method for exchanging data between a mobile terminal, a first device of smart card type, and a second device wherein said second device is a secure device comprising a Universal Integrated Circuit Card (UICC) in which credentials are stored, said mobile terminal comprising said first device, said second device being a remote device, the method comprising: establishing a communication tunnel by pairing said first device and said second device, exchanging data between the second device and the mobile terminal through said first device wherein said first device is adapted to act as a proxy for said second device so that the secure device appears local for the mobile terminal, the pairing being released after each power cycle of the mobile terminal.

8. The method according to claim 7, comprising using Ultra Wide Band (UWB) as wireless communication channel for exchanging application data after the pairing of said devices.

9. The method according to claim 7, wherein the pairing between the smart card and the second device is released when a distance between the mobile terminal and the remote second device is greater than a predetermined distance, said distance between the mobile terminal and the remote second device being measured with Real Time Location Service technology.

10. The method according to claim 7, further comprising a mutual authentication step between said smart card and said second device.

11. The method according to claim 7, further comprising receiving Application Protocol Data Unit (APDU) commands from the remote second device, sending said APDU commands to the mobile terminal and vice versa.

12. The communication system according to claim 1, wherein the pairing is released after each power cycle of the remote second device.

13. The communication system according to claim 1, wherein the pairing is released after an explicit action of a user on the mobile terminal.

14. The communication system according to claim 1, wherein the pairing is released when an application distance between the mobile terminal and the second device is greater than a defined limit.

15. The communication system according to claim 14, wherein the Real Time Location Service (RTLS) technology is applied to measure the application distance.

16. The communication system according to claim 1, wherein the second device is of UICC type.

* * * * *